W. ARTER.
WORK HANDLING MECHANISM.
APPLICATION FILED DEC. 28, 1916.

1,357,924.

Patented Nov. 2, 1920.
2 SHEETS—SHEET 1.

INVENTOR
William Arter
By his attorney

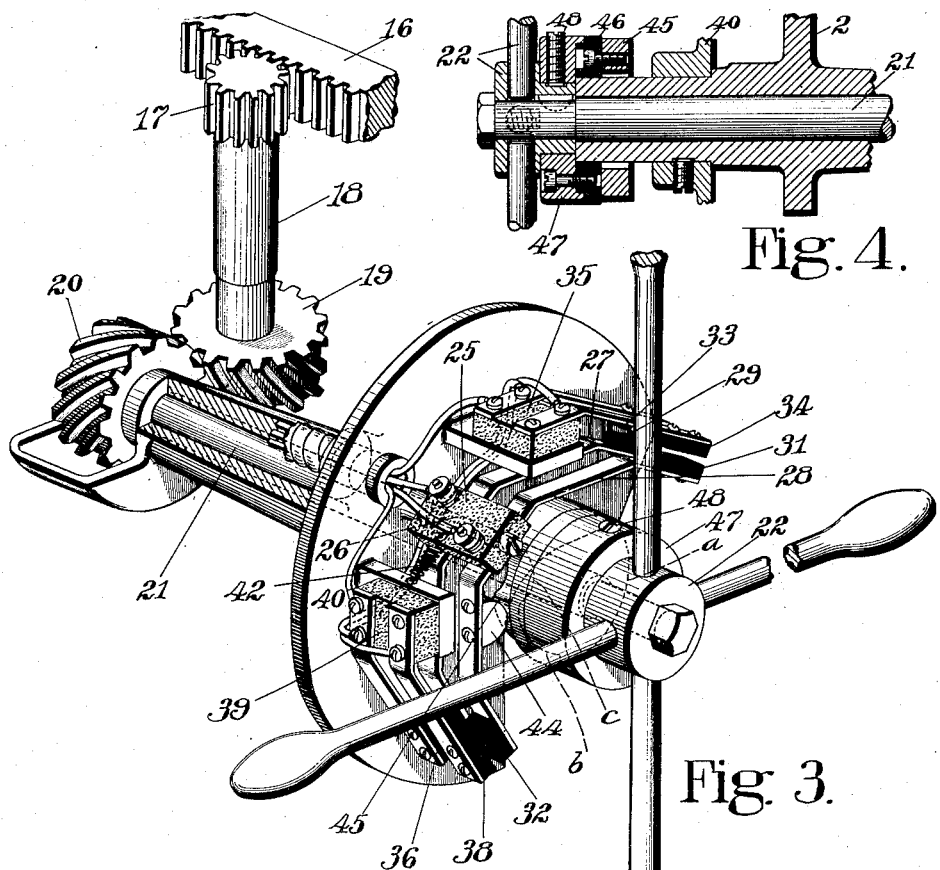
Fig. 4.
Fig. 3.
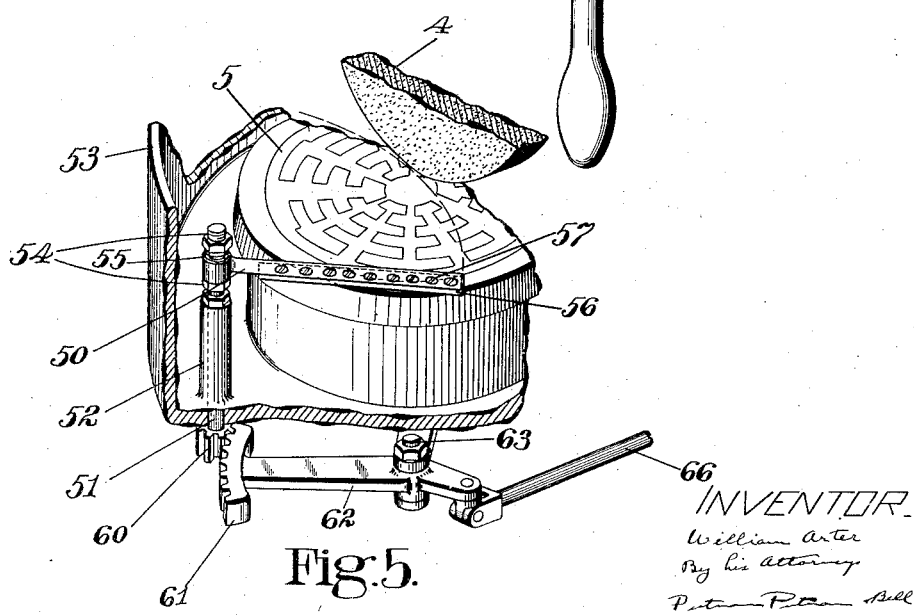
Fig. 5.

UNITED STATES PATENT OFFICE.

WILLIAM ARTER, OF WORCESTER, MASSACHUSETTS, ASSIGNOR TO THE PERSONS-ARTER MACHINE COMPANY, OF WORCESTER, MASSACHUSETTS, A CORPORATION OF MASSACHUSETTS.

WORK-HANDLING MECHANISM.

1,357,924.   Specification of Letters Patent.   Patented Nov. 2, 1920.

Application filed December 28, 1916. Serial No. 139,393.

*To all whom it may concern:*

Be it known that I, WILLIAM ARTER, a subject of the King of Great Britain, residing at 540 Salisbury street, Worcester, in the county of Worcester and State of Massachusetts, have invented certain Improvements in Work-Handling Mechanisms, of which the following description, in connection with the accompanying drawings, is a specification, like reference characters on the drawings indicating like parts in the several figures.

This invention relates to the work handling mechanisms for machine tools and the like and will be herein disclosed as embodied in a grinding machine.

The invention has for its chief object to devise means for facilitating the presentation of work to and its removal from machines of this general class with a view particularly to effecting an economy in the time and labor required to perform these operations. It is a common practice in machines of this general character to use magnetic chucks to support the work for presentation to the tool or tools that operate on it, and the present invention is concerned particularly with work handling mechanisms designed for use in machines in which such chucks are employed. Stated more specifically, the invention aims to devise a simple, reliable and efficient mechanism for automatically removing the work from the chuck and preferably also for cleaning the chuck in readiness to receive the next piece of work. In using apparatus of this character in connection with a magnetic chuck it is, of course, necessary to provide some means for deënergizing the chuck before the work is removed. Furthermore, chucks of this character usually have sufficient residual magnetism to make it relatively difficult to remove the work from them even after the energizing current has been cut off. Accordingly, the present invention provides novel means operative automatically in timed relationship to the operation of the work removing apparatus to demagnetize the chuck preparatory to the work shifting operation.

The particular manner in which it is here proposed to accomplish these objects, and the various features of the invention will be readily understood from the following description of the embodiment of the invention now preferred by me, reference being made to the accompanying drawings, in which—

Fig. 3 is an angular view showing the switch that controls the flow of current to the magnetic chuck and the mechanism for operating said switch;

Fig. 4 is a central, cross sectional view showing part of the switch mechanism shown in Fig. 3; and Fig. 5 is an annular view showing the work removing and chuck cleaning device.

Figure 1:
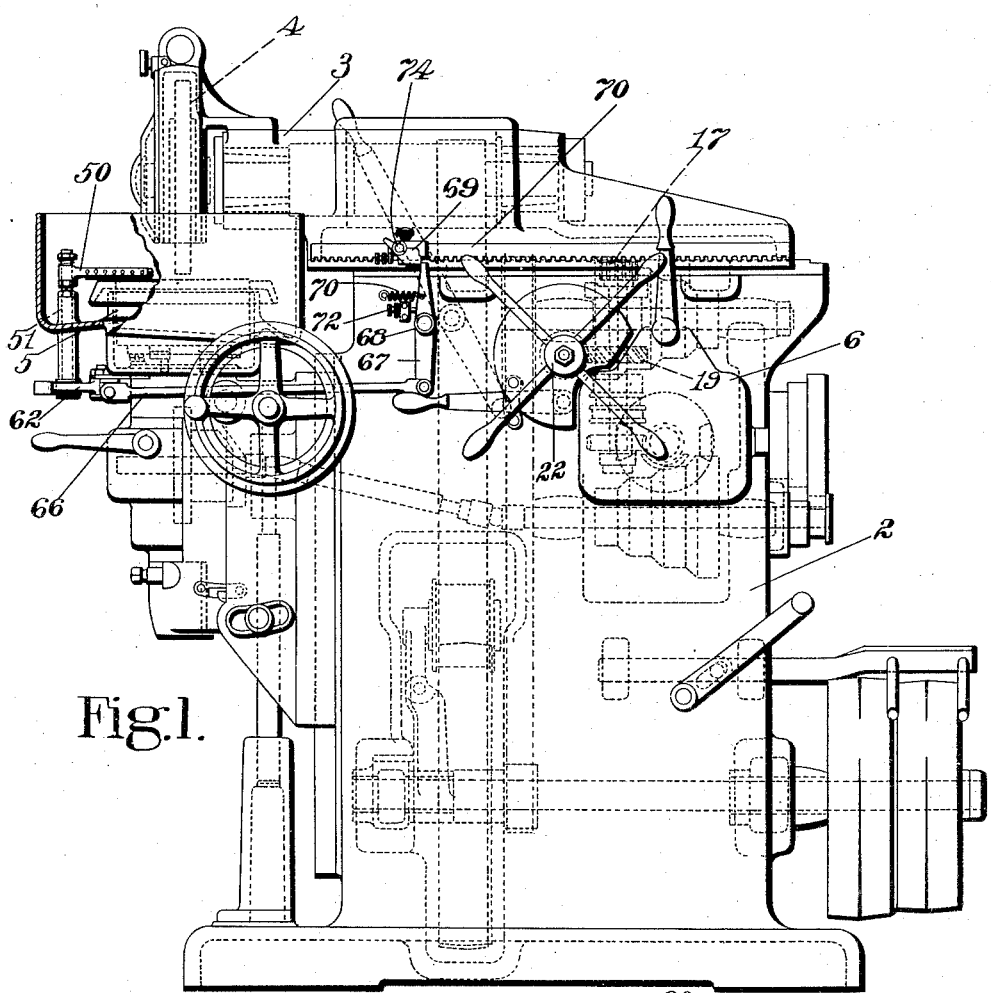
Figure 1 is a side elevation of a machine equipped with apparatus constructed in accordance with this invention.

Fig. 1 shows a grinding machine of a general type common on the market and which comprises a frame 2 having horizontal ways on which a wheel head or table 3 is mounted to reciprocate. This table carries a grinding wheel 4, and its reciprocating motion transfers the point of operation of the wheel back and forth over a magnetic chuck 5 on which the work is supported. The chuck is arranged to be rotated by a suitable driving mechanism and is, of course, mounted in a chuck supporting bracket which can be raised or lowered as desired. The table 3 is given its reciprocating movement by means of suitable driving mechanism supported in the machine frame, this mechanism including a reversing apparatus contained in the casing 6 and which may conveniently be of the character shown in Patent No. 1,184,905, granted May 30, 1916.

Figure 2:
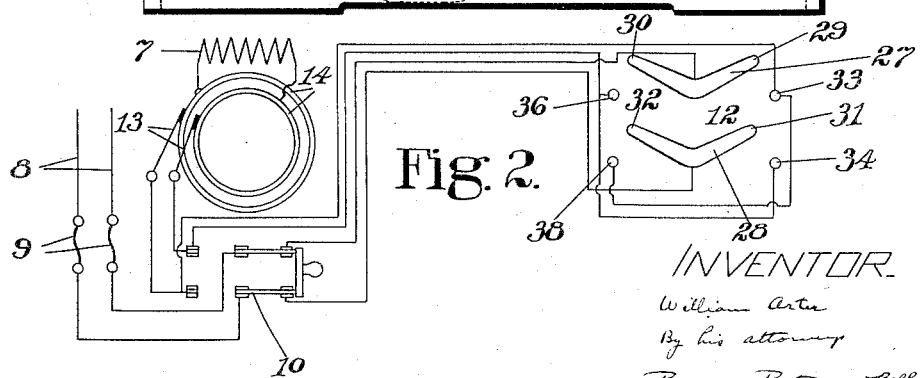
Fig. 2 is a diagrammatic view showing the arrangement of electrical circuits which the apparatus includes.

As shown in Fig. 2, the electric current which energizes the magnetizing coil 7 of the magnetic chuck 5 is conducted from supply means 8 through suitable fusing devices 9 and the main controlling switch 10 to an automatic reversing switch 12 of a novel construction and then to connections that lead to brushes 13 running on slip rings 14 to which the terminals of the coil 7 are connected. Assuming the switch 10 to be closed in a direction to render the automatic switch 12 operative, and the latter switch normally being closed in one direction to energize the chuck, the chuck can be demagnetized by opening the switch 12 so as to cut off the energizing current and then reversing this switch momentarily so as to neutralize the residual magnetism which the chuck still retains. It is, of course, desirable to have this demagnetization of the chuck take place at a predetermined point in the operation of the tool along the work, and accordingly the apparatus provided for this purpose by this invention is arranged to be operated automatically by connections with the wheel head of table 3.

Referring particularly to Figs. 1 and 3, it will be seen that the table 3 has secured to its lower side a rack 16 meshing with a pinion 17 fast on the upper end of a shaft 18, the lower end of said shaft having fixed thereto a spiral gear 19 which meshes with a corresponding gear 20 fast on a horizontal shaft 21 that is rotatably mounted in a part of the machine frame. The hand wheel 22 is fixed to the forward end of this shaft 21 and the connections just described between this wheel and the table 3 enabling the workman to move the grinding wheel 4 back and forth over the chuck by hand whenever he desires to dispense with the automatic mechanism that normally is employed to reciprocate the table 3. It will be evident, however, that when this automatic operating mechanism is employed, the connections just described will oscillate the shaft 21, and since these connections are positive, the movements of the shaft 21 produced in this manner will bear a definite time relationship to the movements of the table. Advantage is taken of this fact to utilize the shaft 21 to drive the automatic switch 12. The detailed construction of this switch is best shown in Fig. 3, from which it will be seen that the switch includes an insulating block 25 pivoted on a stud 26 and carrying two metallic arms 27 and 28, respectively, which lie side by side and both extend at opposite sides of the block. The arm 27 carries two contacts, 29 and 30, one at each end, and the other arm 28 also carries similar contacts 31 and 32. The block 25 is provided with binding posts to which the current is led by suitable conductors to the switch arms 27 and 28. The contacts 29 and 31 are arranged to engage respectively with like contacts 33 and 34 mounted on the ends of stationary conducting arms or plates secured to the stationary insulating block 35, and the contacts 30 and 32 are also positioned to engage similar contacts 36 and 38 mounted on the ends of another pair of conducting arms secured to an insulating block 39, both the blocks 35 and 39 being mounted on brackets that project from the base 40 of a casing in which the switch parts are inclosed. This casing, as shown in Fig. 4, is secured to the bearing formed in the machine frame for the shaft 21. The diagram of Fig. 2 shows the connections to these several contacts. A spring 42 acts on the block 25 in a direction tending to so tip it about its pivot 26 as to hold the contacts 29 and 31 in engagement with their coöperating contacts 33 and 34. This engagement, however, is permitted at certain times only in the stroke of the table 3. For the purpose of controlling this engagement a cam piece 44 is secured to one of the arms 28 and is arranged to ride on the periphery of a cam 45 which is secured to an insulating block 46 mounted fast on a collar 47 which is clamped adjustably on the hub of the hand wheel 22 by means of a set screw 48. The cam 45 thus is compelled to rotate with the shaft 21, but its angular relationship to said shaft can be adjusted. As clearly shown in Fig. 3, the cam 45 has a high part $a$, a lower portion $b$ and a notch or depression $c$. These cam surfaces are so designed that when the cam piece 44 is on the part $a$ of the cam, the contacts 30 and 32 will be held in engagement with their coöperating contacts 36 and 38, thus closing the circuit through the chuck magnetizing coil 7. When, however, the part 44 is allowed to drop on to the surface $b$, the spring 42 moves the switch arms 27 and 28 into a neutral position, thus cutting off the flow of current through the coil 7 and deenergizing the chuck. If the cam 45 is turned still farther, so that the cam piece 44 is allowed to drop into the notch $c$, the spring 42 will then swing the contacts 29 and 31 into engagement with the contacts 33 and 34 and allow current to flow through the magnetizing coil in a direction opposite to that in which it normally flows through said coil. This reversal of current is only momentary, however, and is made merely long enough to neutralize the residual magnetism which the chuck retains. Since the cam 45 is adjustable on the shaft 21, in the manner above described, it can be set to maintain the chuck energized during any desired part of the stroke of the table 3 and to demagnetize the chuck at any desired point in the stroke.

The work removing apparatus includes an arm 50 keyed to a shaft 51 arranged to oscillate in a bearing 52 which may conveniently be formed in a part of the water pan 53 with which machines of this type usually are provided. The arm 50 may be adjusted vertically on the shaft 51 by means of two nuts 54 between which the hub of the arm is mounted. A spring 55 encircles the upper end of the shaft and bears at one end against the hub of the arm 50 and at its opposite end against one of the upper nuts 54. Preferably the arm 50 is long enough to sweep past the axis of rotation of the chuck 5, and it is split, as shown in Fig. 5, to receive a strip 56 of rubber, felt or other suitable material adapted to clean the work supporting face of the chuck. A series of screws 57 serve to clamp the material 56 in the arm 50.

For the purpose of swinging this arm back and forth across the face of the chuck 5, a pinion 60 is secured to the lower end of the shaft 51 and meshes with a segment 61 formed on one end of a bell crank lever 62 which is fulcrumed at 63 and the other end of which is connected by a link 66 to the lower end of a lever 67 (see Fig. 1) fulcrumed on the machine frame at 68, and having its upper end projecting into the path of movement of a dog 69 which is adjustable along the rack 70 fixed to the table 3. The construction of the dog 69, and the manner in which it is adjusted longitudinally of the rack 70, is clearly disclosed in the patent above designated. It is obvious that it is usually desirable to remove the work from the chuck 5 while the wheel 4 is near the backward limit of its stroke. Accordingly the dog 69 is set on the rack 70 to engage the upper end of the lever 67 at the proper point in the backward stroke of the table 3 and this engagement, acting through the connections just described, swings the work removing arm 50 across the face of the chuck thus causing it to sweep off the piece of work which has just been operated upon by the wheel 4, and which, therefore, it is desired to have removed. As soon as the lever 67 is released from engagement with the dog 69, the spring 70 (see Fig. 1) returns the lever to its former position, an adjustable stop 72 being provided to determine this position. This spring acts through the connections with the arm 50 to return the arm to its original position. If the dog 69 passes beyond the upper end of the lever 67, it will be tipped upwardly about its pivot 74 when it engages the upper end of the lever 67 again on its forward stroke and thus you will not operate the lever at this time.

It will now be understood that the apparatus above described is operative to demagnetize the chuck at any point in the stroke of the tool 4 and to sweep the work off the chuck while it is so demagnetized. The work remover 50 also acts to clean the surface of the chuck of filings or metallic particles while it is performing its work removing function. Since both the work remover and the reversing switch are operated by positive connections with the table 3 they may be made to operate very accurately with reference to the movement of this table and the tool 4. The switch 10 enables the workman to cut out the automatic reversing switch whenever he desires and either run the chuck in a demagnetized condition or to connect the chuck properly with the mains 8 and operate it without using the automatic reversing switch. It is obvious that apparatus of the character described by this invention is of particular utility in operating on small pieces of work, as, for instance, in grinding piston rings where each ring is subjected to the operation of the grinding tool while it makes a single reciprocation as the tool arrives near the backward limit of its stroke the apparatus described demagnetizes the chuck, removes the work from it and cleans the face of the chuck. The workman thus is relieved of these duties and is required merely to place the next ring on the chuck in the proper position to be ground. This he can do immediately after the work removing and cleaning device has made its stroke, and while the grinding tool is still near the backward limit of its stroke.

It will, of course, be understood that the apparatus is applicable to other machines than that specifically mentioned herein, and that the invention is capable of embodiment in many forms differing in detail from that shown while still retaining its essential features and characteristics. The invention obviously is not limited to the conjoint use of the several features disclosed.

The switch and work removing and cleaning device herein are claimed *per se*, but the right is reserved to claim these features in divisional applications.

Having thus described my invention, what I claim as new and desire to secure by Letters Patent of the United States is:

1. In a machine of the character described, the combination of a magnetic chuck for holding the work, a tool for operating on the work, mechanism for moving said tool to transfer its point of operation over the work, and mechanism operative automatically to energize and deënergize said chuck at predetermined points in said movement of the tool.

2. In a machine of the character described, the combination of a magnetic chuck for holding the work, a tool for operating on the work, mechanism for relatively moving said chuck and tool to transfer the point of operation of the tool over the work, and mechanism operative automatically to energize and deënergize the chuck at predetermined points in said relative movement and to momentarily reverse the current through the chuck after it has been deënergized to neutralize the residual magnetism in the chuck without building up a reverse magnetic field.

3. In a machine of the character described, the combination with a magnetic chuck adapted to support the work, a tool arranged to operate on the work supported on said chuck, means for relatively moving said tool and work to transfer the point of operation of the tool over the work, and mechanism operative automatically to effect a predetermined change in the magnetic condition of said chuck at a predetermined point in said relative movement.

4. In a machine of the character described, the combination of a magnetic chuck having a horizontal work holding surface, a tool head, a tool mounted on said head, mechanism for supporting and operating said head to reciprocate the tool over the work holding surface of said chuck, a reversing switch controlling the flow of current through said chuck, and mechanism for automatically operating said switch to energize and deënergize said chuck at predetermined points in the travel of said tool head and to momentarily reserve the current through the chuck after it has been deënergized to neutralize the residual magnetism in the chuck.

5. In a machine of the character described, the combination with a magnetic chuck adapted to support the work, a tool for operating on the work supported on said chuck, mechanism for relatively reciprocating said tool and work to transfer the point of operation of the tool over the work, a switch controlling the flow of current to said chuck, and connections between said switch and said mechanism whereby said mechanism is enabled to operate said switch in timed relationship to said relative movement.

6. In a machine of the character described, the combination with a magnetic chuck adapted to support the work, a tool for operating on the work supported on said chuck, mechanism for relatively reciprocating said tool and work to transfer the point of operation of the tool over the work, a switch controlling the flow of current to said chuck, and connections between said switch and said mechanism whereby said mechanism is enabled to operate said switch in timed relationship to said relative movement, said connections being adjustable to vary said relationship and including a cam driven by said mechanism.

7. In a machine of the character described, the combination with a magnetic chuck adapted to support the work, a tool for operating on the work supported on said chuck, mechanism for relatively reciprocating said tool and work to transfer the point of operation of the tool over the work, a switch controlling the flow of current to said chuck, said switch comprising a pair of fixed contact members and a pair of pivoted contact members, and connections between said switch and said mechanism whereby said mechanism is enabled to operate said switch in timed relationship to said relative movement, said connections including an adjustable cam having high and low portions adapted at successive points in its rotation to move said pivoted contact members into and out of engagement with said fixed contact members.

8. In a machine of the character described, the combination with a magnetic chuck adapted to support the work, a tool for operating on the work supported on said chuck, mechanism for relatively reciprocating said tool and work to transfer the point of operation of the tool over the work, a switch controlling the flow of current to said chuck, said switch comprising two pairs of fixed contact members and a pair of double armed pivoted contact members coöperating with said fixed contacts and arranged to engage alternately the first and second pair of said fixed contact members, circuit connections enabling said switch to reverse the flow of current through said chuck, and connections between said switch and said mechanism whereby said mechanism is enabled to operate said switch in timed relationship to said relative movement, the latter connections including an adjustable cam having high and low portions coöperating with said pivoted contact members to energize and deënergize the chuck and to momentarily reverse the current through said chuck after it has been deënergized to neutralize the residual magnetism in the chuck.

In testimony whereof I have signed my name to this specification in the presence of two subscribing witnesses:

WILLIAM ARTER.

Witnesses:
 MARVIN M. TAYLOR,
 ETHEL SHEEHAN.